United States Patent [19]

Hodges

[11] Patent Number: 4,463,055
[45] Date of Patent: Jul. 31, 1984

[54] REFLECTIVE FILM AND METHOD OF APPLYING SAME

[76] Inventor: Marvin P. Hodges, 6162 Leeland Street S., St. Petersburg, Fla. 33715

[21] Appl. No.: 489,247

[22] Filed: Apr. 27, 1983

[51] Int. Cl.³ .................................................. B32B 15/08
[52] U.S. Cl. ...................................... 428/458; 156/229; 156/285; 428/461; 428/464
[58] Field of Search .................. 428/31, 457, 458, 461, 428/464; 156/229, 285

[56] References Cited

U.S. PATENT DOCUMENTS

| | | | |
|---|---|---|---|
| 2,682,491 | 6/1954 | Hahn | 428/64 X |
| 3,442,741 | 5/1969 | Specht | 156/229 |
| 3,776,805 | 12/1973 | Hansen | 428/35 |
| 3,839,129 | 10/1974 | Neumann | 428/912.2 X |
| 4,101,698 | 7/1978 | Dunning et al. | 428/31 |
| 4,235,949 | 11/1980 | Van Manen et al. | 428/458 X |
| 4,418,114 | 11/1983 | Briggs et al. | 428/218 |

Primary Examiner—Henry F. Epstein
Attorney, Agent, or Firm—Mason, Kolehmainen, Rathburn & Wyss

[57] ABSTRACT

A reflective film suitable for reflecting light and radio frequency energy includes a thin annealed metal foil affixed to a polymeric carrier layer or substrate wherein the polymeric carrier is thicker than the metal foil so that the foil tends to assume the physical properties, and particularly the elongation of the carrier without rupture or surface cracking of the foil upon stretching. In this manner, the polymer-metal foil laminate can be substantially deformed and stretched to fit complex shapes while maintaining a continuous, 100% reflective foil layer. The elasticity and yield strength of the substrate are selected to permit the combined foil and substrate to be stretched to fit complex shapes.

23 Claims, 6 Drawing Figures

U.S. Patent  Jul. 31, 1984  4,463,055
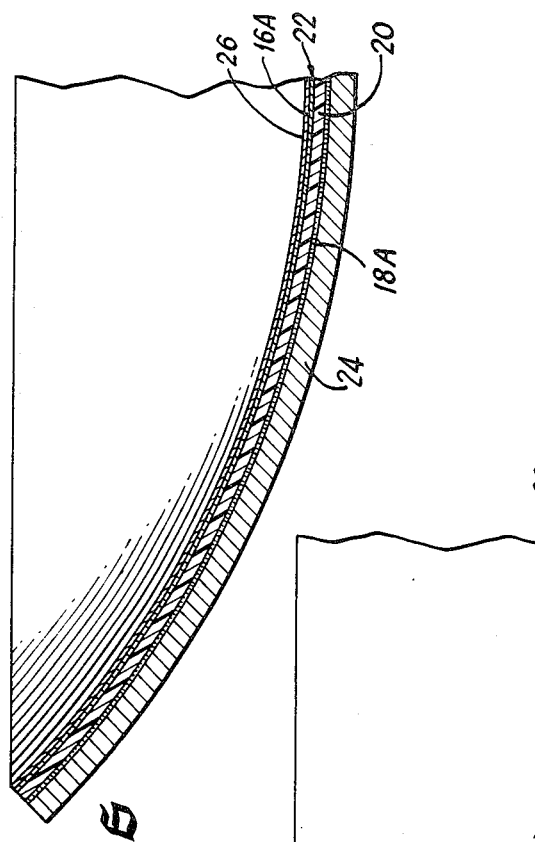
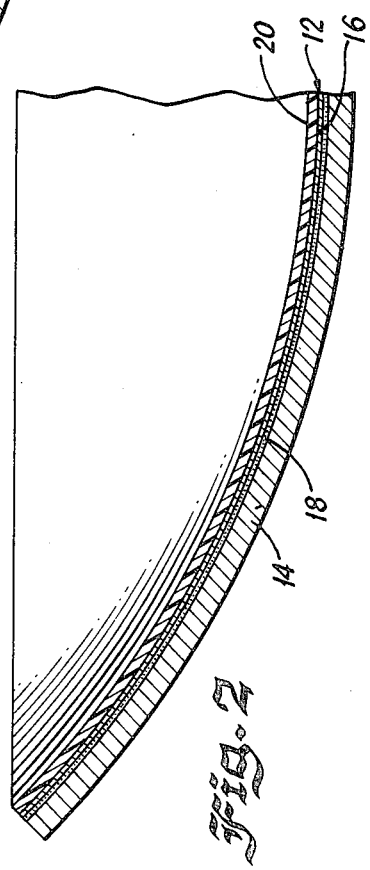
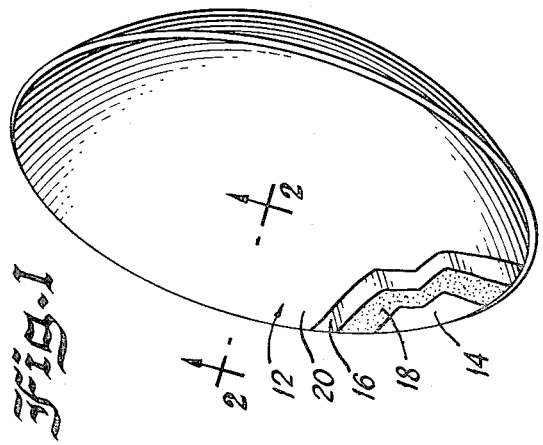
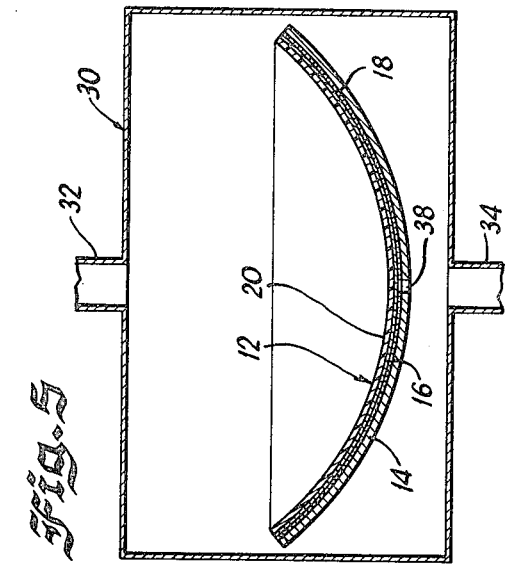
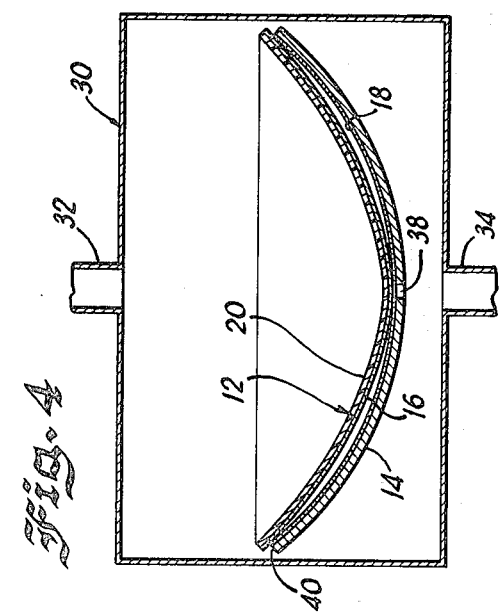
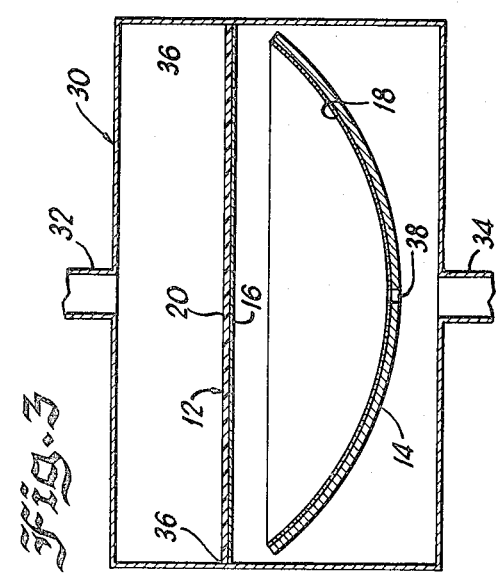

REFLECTIVE FILM AND METHOD OF APPLYING SAME

BACKGROUND OF THE INVENTION

1. Field of the Invention

This invention relates generally to reflective layers for radio frequency and light energy, and more particularly to the use of a metal foil as a reflective layer and the method of applying the foil to a light or radio frequency energy reflector.

2. Prior Art

Devices for achieving the controlled reflectance of light and radio frequency energy are known. Such reflectors may utilize discrete or continuous metal surfaces or spun or stretch formed reflectors fabricated for example, from aluminum. Metal spraying and conductive paints on a nonconductive layer are also known.

Whereas these techniques provide a way to achieve controlled reflectance of light or radio frequency energy, a reflector utilizing metal spraying techniques or conductive paints generally does not provide efficient or accurate reflectance. Spun or stretch formed reflectors are superior to reflectors having metal spray or conductive reflective surfaces, but do to the nature of the spinning or stretch forming process, the reflective surface is not as precise as would be desirable to achieve controlled reflectance. The use of continuous or discrete accurately formed metal surfaces provides much better control of the reflectance process; however, such reflectors tend to be costly and difficult to manufacture.

SUMMARY OF THE INVENTION

In brief, the present invention is directed to an energy reflective polymer-metal film laminate capable of reflecting light and radio frequency energy. The laminate is substantially deformable and stretchable without causing rupture or cracking of the foil layer when the laminate is secured, as by cold forming, onto a complexly shaped reflector support surface, such as a dish type antenna or dish reflecting surface, typically parabolic in shape, to maintain a continuous, substantially 100% reflective metal foil layer. In accordance with an important feature of the present invention, it has been found that a metal foil can be substantially stretched to elongate 75% to 120% while maintaining the reflective integrity of the foil as a continuous surface, uninterrupted by ruptures or cracks, by bonding the foil to a thicker polymeric film substrate having the following physical properties: an ultimate elongation of greater than 30%; an ultimate tensile strength not greater than 21,000 p.s.i.; and an ultimate yield strength not greater than 8,000 p.s.i. Further, it has been found that polymer-metal foil laminates formed with a polymer layer having the above elongation, tensile strength and yield strength properties can be secured without delamination to a complexly shaped reflector support surface with available pressure sensitive adhesives in a manner to minimize or eliminate trapped gas i.e. air from between the laminate and the reflector support surface. The foil surface maintains the predetermined, controlled shape of the reflector support surface for proper concentration or projection of light or radio frequency energy.

Therefore, it is an object of the present invention to provide a reflective surface useful for light and radio frequency energy that overcomes many of the disadvantages of the prior art reflective surfaces.

Another object of the present invention is to provide a reflective film useful for reflecting light and radio frequency energy that has superior reflectance characteristics and is elastic enough to be stretched over reflectors having complex shapes.

Yet another object of the present invention is to provide a low cost reflector for light or radio frequency energy that has reflectance characteristics comparable to more costly designs.

Another object of the present invention is to provide a reflective polymer-metal foil laminate capable of at least 30% elongation without metal foil rupture.

Still another object of the present invention is to provide a reflective polymer-metal foil film capable of being cold stretched at least 30% without foil rupture and laminated to a support surface in the stretched condition with a pressure sensitive adhesive without delamination from the support surface.

Therefore, in accordance with an important embodiment of the present invention, a thin metal foil, for example, aluminum, having a thickness of, for example, 0.00035 inch is bonded to a polymeric carrier layer or substrate, for example, acrylonitrile-butadiene-styrene (ABS) approximately five times the foil thickness i.e., 0.0015 inch. In the preferred embodiment, a 1.5 mil ABS film has been used to provide an elongation of up to 75% of the initial dimensions of the metal film without tearing the metal foil. This is in contrast to a 4% elongation that is obtainable with the foil alone. The best ultimate elongation has been found to be approximately 120% utilizing a carrier layer or substrate having a tensile modulus of 250,000 psi and a yield strength of 4,700 psi. Such a film is readily applied to complex shaped reflectors utilizing vacuum application techniques.

DESCRIPTION OF THE DRAWING

These and other objects and advantages of the present invention will become more readily apparent upon consideration of the following detailed description and attached drawing wherein:

FIG. 1 is a perspective view of a dish antenna or solar reflector having a polymer-metal foil laminate adhered to an inner surface;

FIG. 2 is an enlarged, partially broken away cross sectional view taken along the line 2—2 of FIG. 1;

FIG. 3 is a side view of a vacuum chamber used adhesively to secure the laminate to the support surface, having therein a curved support surface and a polymer-metal foil laminate;

FIG. 4 is a side view of the vacuum chamber of FIG. 3 showing the initial contact of the laminate onto the curved support surface when vacuum differential is applied across the laminate;

FIG. 5 is a side view of the vacuum chamber of FIGS. 3 or 4 showing the laminate completely secured to the curved support surface with a pressure sensitive adhesive; and FIG. 6 is an enlarged, partially broken away view of another polymer-metal foil laminate secured to a curved surface with a pressure sensitive adhesive.

DETAILED DESCRIPTION OF THE INVENTION

In accordance with the present invention, a metal foil is laminated to a suitable polymeric carrier film to provide an energy reflective laminate capable of being substantially stretched when laminated to a suitably shaped support surface, such as a curved projection screen, dish type antenna or dish type solar energy reflecting surface, typically parabolic in shape. In accordance with an important feature of the present invention, the polymer carrier film is chosen to have an ultimate elongation greater than 30%; an ultimate tensile strength not greater than 21,000 p.s.i.; and an ultimate yield strength not greater than 8,000 p.s.i. to provide a foil-polymer laminate capable of being substantially stretched when secured to a complexly shaped surface without causing ruptures or cracks in the metal foil, and to provide a laminate capable of being secured without delamination to the complexly shaped surface with available pressure sensitive adhesives.

In accordance with the present invention, a thin, soft, fully annealed metal foil having a thickness on the order of 0.5-5 mils is suitably bonded to a properly selected polymeric carrier film to provide a radio frequency or light energy reflective laminate capable of being substantially stretched without damage to the reflective metal foil when the laminate is secured to a complexly shaped laminate support surface, such as a parabolic antenna dish. To achieve the full advantage of the present invention, the foil should be soft or fully annealed to provide a foil layer having maximum stretchability without damage. Depending upon the required degree of stretching in order to secure the laminate to a particularly shaped support surface, foils which are not fully annealed are also useful in accordance with the principles of the present invention. Generally, any metal foil can be used in accordance with the present invention since, when bonded to a properly selected polymeric carrier film, the foil will take on the physical characteristics of the polymer carrier film to provide new and unexpected elongation without foil damage.

In accordance with one important embodiment of the present invention, it has been found that the softer metals such as aluminum, gold, silver, brass and the like behave more predictably and yield more consistently than do the harder metals such as iron, copper, nickel and the like. Further, it has been found that the nonferrous metals behave more predictably than the ferrous metals when bonded to a suitably selected polymeric carrier film in accordance with the present invention.

The polymeric carrier films useful in accordance with the present invention in forming a polymer-metal laminate are any films which, at the thickness used in lamination to the metal foil, have an ultimate elongation greater than 30%; an ultimate tensile strength not greater than 21,000 p.s.i. and an ultimate yield strength not greater than 8,000 p.s.i. The polymeric carrier film should be thicker than the metal foil so that the foil assumes the characteristics of the polymeric carrier, particularly elongation. The carrier can be up to 5 to 10 times thicker than the metal foil so long as the polymeric film or layer has an ultimate elongation greater than 30%; an ultimate tensile strength not greater than 21,000 p.s.i.; and an ultimate yield strength not greater than 8,000 p.s.i. Generally, polymeric carrier films having a thickness in the range of about 0.5-10 mils are suitable in accordance with the principles of the present invention. Depending upon the particular polymeric material employed as the carrier film, different thicknesses may be required in order to provide a carrier film having the required elongation, tensile strength and yield strength.

Any polymeric film having an ultimate elongation greater than 30% an ultimate tensile strength not greater than 21,000 p.s.i. and an ultimate yield strength not greater than 8,000 p.s.i. is useful in accordance with the present invention for lamination to a foil layer. Examples of suitable polymeric carrier films include acrylonitrile-butadiene-styrene (ABS); acrylics such as the polyacrylates, for example polymethyl methacrylate; polyvinyls such as polyethylene, polypropylene, and polyethylene and ethylene copolymers; polystyrene; nylons including the biaxially oriented nylons and the polyamides; polyesters such as polyethylene terephthalate; plasticized and non plasticized polyvinyl chlorides and vinyl chloride-acetate copolymers; vinylidene chloride-vinyl chloride copolymers; polycarbonates; polyimides; polymethylpentene; cellulosic films such as cellulose acetate, cellulose triacetate, cellulose acetate butyrate, cellulose propionate, ethyl cellulose, regenerated cellulose (cellophane); the fluoroplastics such as ethylene-chlorotrifluoroethylene copolymers, ethylenetetrafluoroethylene copolymers, fluorinated ethylene propylene copolymers, perfluoroalkyl polymers, polychlorotrifluoroethylene copolymers, polytetrafluoroethylene, polyvinyl fluoride, and polyvinylidene fluoride. Generally, the polymeric carrier is employed in a thickness of 0.5-3 mills. Some of the polymers such as polypropyene and polyethylene are used in greater thicknesses, of for example, 3-5 mils for handling purposes since some films are flimsy and difficult to handle in smaller thicknesses. The polyvinyl polymeric carriers generally are most useful from a handleability standpoint at a thickness of about $\frac{1}{2}$ to 4 mils. The polyesters, on the otherhand, can be used in very small thicknesses on the order of 0.5-1.5 mils to provide excellent handleability while maintaining ultimate elongation, tensile strength and yield strength within the required values.

Any suitable laminating adhesive can be used to bond the foil to the polymeric carrier. For example, any pressure sensitive, contact, heat activated, ultraviolet light activated, solvent based contact, aerobic or anaerobic sealants are useful in bonding the foil to the polymeric carrier. If a solvent based sealant is used, the solvent should be driven off prior to adhering the foil to the polymeric carrier to avoid liquid or gas entrapment between the foil and polymeric carrier. In one embodiment, a heat activated dry adhesive is used between the foil and polymeric carrier and the adjacent layers of polymer film and metal foil are conveyed through a heated pressure nip to securely bond the foil to the polymeric carrier.

In accordance with an important feature of the present invention, the foil, securely bonded to a properly selected polymeric carrier film can be cold, stretch formed and secured in the cold, stretch formed condition to a complexly shaped curved projection screen, radio frequency energy or light energy reflecting support surface to conform the foil layer to the shape of the support surface for concentration or projection of radio frequency or light energy. The foil-polymer laminate is secured to a suitably shaped support surface, i.e. a parabolic dish, suitably shaped to concentrate the radio frequency or light energy toward a radio frequency detector or a solar energy receiving device, or to suitably reflect light from a matte foil finish.

As shown in the drawing (FIGS. 1 and 2) a polymer-metal foil laminate, designated generally by reference numeral 12, is secured to the dish or other curved support surface 14 with a foil layer 16 adhered to the support surface 14 with a thin, e.g. 0.5-1 mil, pressure sensitive adhesive layer 18. The reflector of FIGS. 1 and 2 is useful as a radio frequency reflector or antenna and the metal foil is protected by an outer polymer layer 20. The laminate 12 can be secured to the support surface in the opposite direction but this would necessitate an exterior protective coating applied over the outer foil layer. When the laminate 12 is used as a radio frequency reflector, the foil layer 16 should be covered on its outer surface with a relatively opaque coating to eliminate or substantially lessen light reflectance from the foil layer which might be distractive or harmful to the public. The polymer layer 20 can be pigmented to be opaque so that when secured to a curved support surface 14, as shown in FIG. 2, the polymer layer 20 protects the foil layer 16 and also serves the function of eliminating light reflectance from the foil layer.

In accordance with another important feature of the present invention, as shown in FIG. 6, another polymer-metal foil laminate designated generally by reference numeral 22, of similar construction, is secured to a curved light energy reflecting or projection surface 24 for the concentration of solar energy or screen image projection. When used for solar energy concentration or screen image projection, as shown in FIG. 6, a polymeric carrier layer 20A forms the inner layer secured with a pressure sensitive adhesive 18A to the curved support surface 24, and the metal foil layer 16A is preferably top coated with a thin transparent layer protective film 26. The metal foil should be specular or semi-specular for front projection screen and solar concentrator applications, and the outer protective thin film 26 can be adhesively bonded to the foil 16A, or applied as a liquid and cured to form a solid transparent protective covering 26 for the metal foil 16A. Any suitable protective film, such as a polyacrylic, can be used as the outer protective film 26 so long as it is transparent.

In accordance with an important feature of the present invention, the laminate 12 or 22, formed by securing a metal foil to a properly selected polymeric carrier having an ultimate elongation greater than 30%, an ultimate tensile strength not greater than 21,000 p.s.i. and an ultimate yield strength not greater than 8,000 p.s.i. can be cold stretch formed against a curved support surface 14 or 24, and bonded to the curved support surface in the stretched condition using a pressure sensitive adhesive 18, 18A without subsequent delamination of the laminate 12 from the support surface.

The pressure sensitive adhesive should be a relatively high tack, high shear adhesive, such as an acrylic polymer or copolymer. One suitable pressure sensitive adhesive found useful in accordance with the present invention is MORTON 1057 which is a high solids, pressure sensitive adhesive presently used in the automotive industry for securing labels, bumpers and the like onto automobile bodies. The pressure sensitive adhesives will never completely cure to maintain tack and adherence between the laminate 12 and the curved surface 14.

In accordance with an important aspect of the present invention, the laminate can be secured to the curved support surface, as shown in FIGS. 3-5, by disposing the curved support surface within a vacuum chamber 30 and applying a vacuum differential across the laminate 12. For example, the gas within the vacuum chamber 30 can be evacuated through vacuum conduits 32 and 34, centrally disposed above and below the laminate 12, to a level of, for example, 30 inches of mercury vacuum. The laminate 12 is positioned in the vacuum chamber to create at least a partial seal at the inner edges 36 of the vacuum chamber. Air or other gas then can be slowly conveyed into an upper portion of the vacuum chamber 30 to create a vacuum differential of about 3 to 5 p.s.i. across the laminate 12 thereby causing the film to cold stretch and contact a central portion 38 of the curved support surface 14, as shown in FIG. 4. Additional, slow conveyance of gas into the upper portion of the vacuum chamber 30 through vacuum conduit 32 to create a pressure differential of about 5-10 p.s.i. across the laminate 12 forces the laminate 12 to systematically adhere to the curved support surface 14 sequentially from the central portion 38 of the curved surface 14 outwardly toward a peripheral edge 40. The laminate thereby mechanically forces out any gases from between the foil layer 16 and the curved support surface 14 to achieve a tenacious bond that will not delaminate provided that the polymeric carrier is properly selected, as set forth above.

The radio frequency energy reflector and concentrator, such as shown in FIG. 2 can be ultraviolet stabilized and protected from ice buildup by applying a polyflorinated material, i.e. TEDLAR by DuPont, for the polymeric layer 20, or by securing a separate polyflorinated layer over the polymeric carrier 20. The polymeric carrier layer 20, whether one layer or more layers, should have properly selected elongation, tensile and yield strengths to be capable of cold stretch forming onto the curved support surface 14 without foil rupture or delamination from the curved surface 14. The radio frequency reflectors such as shown in FIGS. 1 and 2 are useful, for example, to reflect radio frequencies in bandwidths of 1-35 GHz.

While the invention has been described with reference to details of the illustrated embodiment, such details are not intended to limit the scope of the invention as defined in the following claims.

What is claimed and desired to be secured by Letters Patent of the United States is:

1. An article of manufacture for reflecting radiant energy comprising a curved support surface having cold stretch bonded thereto a partially stretched laminate comprising an extensible, continuous metal foil secured to a polymeric film, said polymer film thicker than the foil and having an ultimate elongation greater than 30% an ultimate tensile strength not greater than 21,000 p.s.i., and an ultimate yield strength not greater than 8,000 p.s.i.

2. The article of claim 1 wherein the metal foil comprises aluminum.

3. The article of claim 2 wherein the aluminum foil has a thickness of 0.00025 to 0.005 inch.

4. The article of claim 1 wherein the polymeric film is a polyester.

5. The article of claim 4 wherein the polyester has a thickness of 0.0005 to 0.002 inch.

6. The article of claim 1 wherein the polymeric film is a polyvinyl.

7. The article of claim 6 wherein the polyvinyl is selected from the group consisting of polyethylene, polypropylene and copolymers thereof, and has a thickness of 0.0015 to 0.005 inch.

8. The article of claim 1 wherein the polymeric film is a polyamide having a thickness of 0.002 to 0.005 inch.

9. The article of claim 1 wherein the polymeric film is a polyvinyl chloride having a thickness of 0.001 to 0.003 inch.

10. The article of claim 1 wherein the polymeric film is acrylonitrile-butadiene-styrene having a thickness of 0.0005 to 0.003 inch.

11. The article of claim 1 wherein the polymeric film is an acrylic having a thickness of 0.001 to 0.005 inch.

12. The article of claim 1 wherein the polymeric film is a polyfluorinated polymer or copolymer having a thickness of 0.0005 to 0.003 inch.

13. The article of claim 1 wherein the laminate is secured to the curved support surface on the foil side of the laminate.

14. The article of claim 1 wherein the laminate is secured to the curved surface on the polymeric film side of the laminate.

15. The article of claim 13 wherein the laminate is secured to the curved surface with a pressure sensitive adhesive.

16. The article of claim 14 wherein the laminate is secured to the curved surface with a pressure sensitive adhesive.

17. A laminate useful for reflecting radiant energy when secured to a curved support surface having a predetermined shape capable of substantial stretching when cold stretch applied to a curved support surface without foil rupture or delamination from the support surface comprising:
an extensible continuous metal foil secured to a polymeric film, said polymeric film being thicker than the foil and having an ultimate elongation greater than 30%, an ultimate tensile strength not greater than 21,000 p.s.i., and an ultimate yield strength not greater than 8,000 p.s.i.

18. The laminate of claim 17 wherein the metal foil comprises aluminum.

19. The article of claim 14 further including a transparent film secured to the foil layer to form an outer protective surface.

20. A method of manufacturing a device for reflecting radiant energy comprising:
securing a continuous metal foil to a polymeric film to form a reflective laminate said polymeric film being thicker than the foil and said polymeric film having an ultimate elongation greater than 30%, an ultimate tensile strength not greater than 21,000 p.s.i., and an ultimate yield strength not greater than 8,000 p.s.i.; and
cold stretch applying the laminate to a curved support surface with an intermediate pressure sensitive adhesive.

21. The method of claim 20 wherein the foil is secured to the polymeric film with a transparent adhesive.

22. The method of claim 20 wherein the laminate is cold stretch applied against the curved support surface while maintaining foil continuity by disposing the laminate adjacent the curved support surface and creating a pressure differential across the major surfaces of the laminate to form a central portion of the laminate against a central portion of the curved support surface, and increasing the pressure differential across the laminate to cause the laminate to contact the curved surface sequentially from the central portion of the curved surface toward a peripheral edge of the curved surface.

23. The method of claim 22 wherein the curved surface and the laminate are disposed in a vacuum chamber and wherein the laminate is disposed to form at least a partial seal against an inner surface of the vacuum chamber.

* * * * *